(No Model.) 2 Sheets—Sheet 1.

J. G. WILLIAMS.
COMBINED FEEDER AND BAND CUTTER FOR THRASHING MACHINES.

No. 502,689. Patented Aug. 1, 1893.

Witnesses:
Jesse Heller.
Philip C. Masi.

Inventor
James G. Williams
by E. W. Anderson
his Attorney.

(No Model.) 2 Sheets—Sheet 2.
J. G. WILLIAMS.
COMBINED FEEDER AND BAND CUTTER FOR THRASHING MACHINES.
No. 502,689. Patented Aug. 1, 1893.
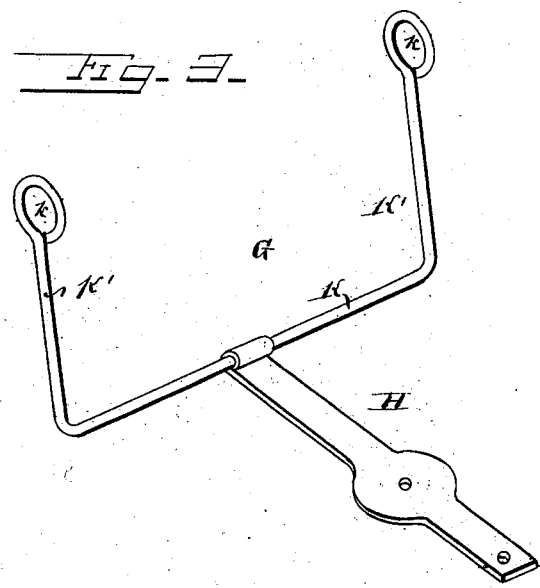
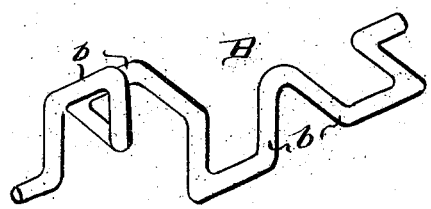
Witnesses:
Jesse Heller,
Philip C. Masi,
Inventor
James G. Williams
by E. W. Anderson,
his Attorney.

UNITED STATES PATENT OFFICE.

JAMES G. WILLIAMS, OF GLASGOW, KENTUCKY, ASSIGNOR OF ONE-HALF TO A. J. CHRISTMAS, OF SAME PLACE.

COMBINED FEEDER AND BAND-CUTTER FOR THRASHING-MACHINES.

SPECIFICATION forming part of Letters Patent No. 502,689, dated August 1, 1893.

Application filed November 26, 1892. Serial No. 453,231. (No model.)

*To all whom it may concern:*

Be it known that I, JAMES G. WILLIAMS, a citizen of the United States, and a resident of Glasgow, in the county of Barren and State of Kentucky, have invented certain new and useful Improvements in a Combined Feeder and Band-Cutter for Thrashing-Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
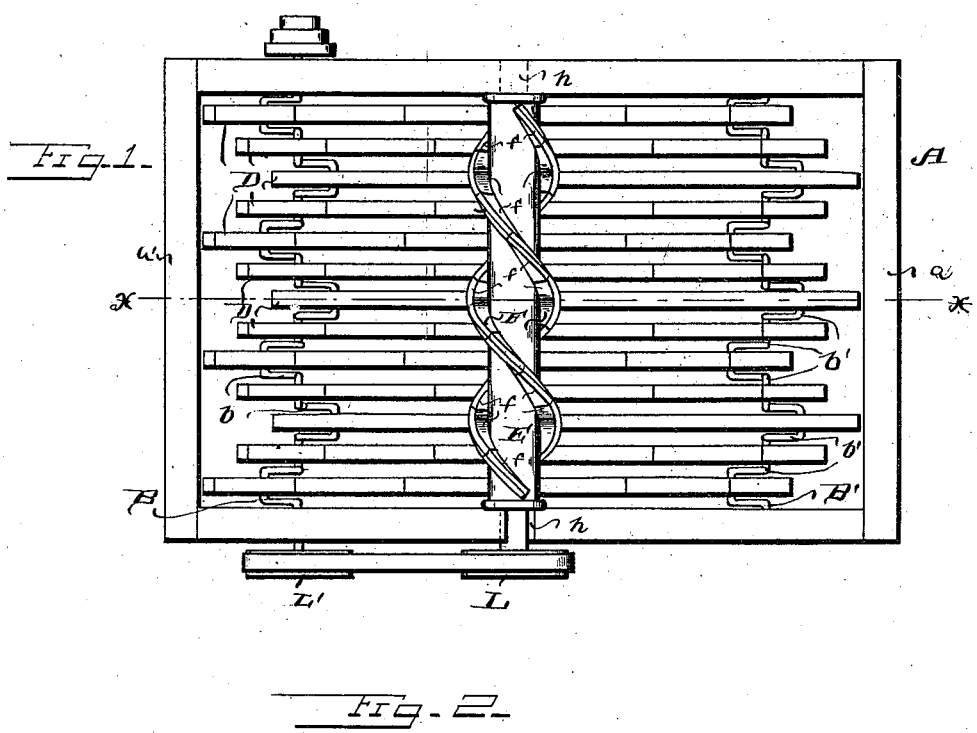
Figure 2:
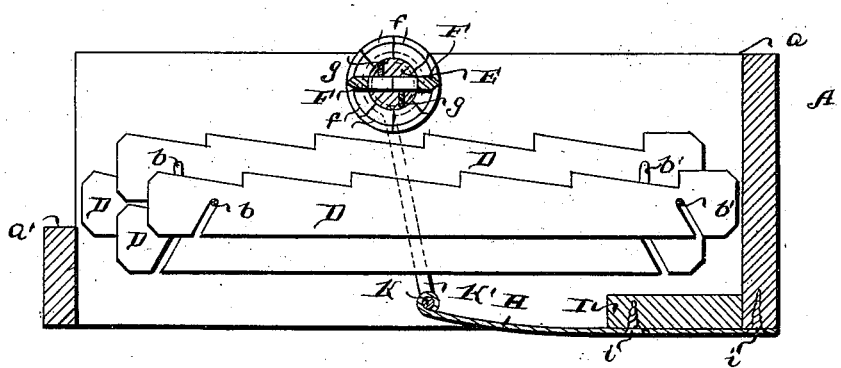

Figure 1 of the drawings is a top plan view of the invention. Fig. 2 is a vertical longitudinal section and Figs. 3, 4 and 5 are detail views.

This invention has relation to certain new and useful improvements in band cutters and feeders for thrashing machines, and it consists in the novel construction and combination of parts, all as hereinafter described and pointed out in the claim.

Referring to the accompanying drawings, the letter A designates the feeder box, which is closed at its rear end $a$, and open at its forward end $a'$. Journaled transversely of said box, one near each end thereof, are two crank shafts B, B', that at the forward end being designated by B, and that at the rear end by B'. The cranks $b$, $b'$, of these shafts are located in close relation to each other, and are set at various angles. Each crank in one shaft has the crank immediately opposite it in the other shaft set at the same angle, and upon the corresponding side of the shaft. Connecting each pair of said cranks is a feed bar D, which is hung loosely at its end portions upon said cranks. Said bars are disposed in edgewise parallel position, working in close relation to each other, and notched or toothed on their upper edges, as shown. As the shafts B, B', are rotated, the feed bars are caused to have a parallel endwise and upward movement, no two of the bars being in the same plane of movement at the same time excepting the two outside bars. The shaft B is driven by a belt, running on a cone pulley D thereon, in order that the speed may be varied according to the grain.

E designates the band cutter, which comprises a cylinder or roll journaled transversely of the feeder box, about midway thereof, and above the feeder bars. Set in said cylinder are two spirally directed knives or cutters F, F', which consist each of the sections $f$, shown in detail in Fig. 4. Said sections comprise each the broad cutting portion $f'$; and a neck or shank $f^2$, which enters the cylinder, and is secured therein by a screw $g$. The shaft of the said cylinder is hung in bearings $h$, $h$, in the walls of the feeder box, said walls being slotted upwardly from said bearings and said shaft is provided with a tension device G, by means of which the cylinder and cutters are rendered self-adjustable to bundles of different sizes. Said device comprises a broad spring arm H, secured by screws $i$, $i$, to the rear bottom edge of the box, and to a board I in the lower rear portion of said box. The forward end of said arm projects to a point slightly to the rear of and below the cylinder, and engages the central horizontal portion of an angular rod K, the vertical arms K' of which extend up, one on each side within the box, the ends of said arms terminating in loops or eyes $k$, $k$, which engage the cylinder shaft just inside its bearings. The tension of this device will hold the cutters down into contact with the smaller bundles, while allowing the cylinder to yield for larger bundles. The cylinder shaft has a pulley L, driven by a belt from a pulley L' on the crank-shaft B. The pulley L should be of somewhat less diameter than the pulley L', in order to increase the speed of the cylinder.

Having described this invention, what I claim, and desire to secure by Letters Patent, is—

In a band cutter and feeder, the combination of a series of rising and falling feeder bars notched or serrated upon their upper edges, said bars forming the table, the crank shafts carrying said bars, and having their cranks set at various angles whereby substantially all of said bars are in different planes of movement at any given time, a rotary cylinder journaled above said feeder bars, and capable of a vertical movement in its bearings, a spring-actuated bail engaging said cylinder, and a pair of continuous spiral cutters on said cylinder, substantially as specified.

In testimony whereof I affix my signature in presence of two witnesses.

JAMES G. WILLIAMS.

Witnesses:
H. C. SMITH,
S. G. SNODDY.